United States Patent
Kokubun et al.

(10) Patent No.: US 10,178,302 B2
(45) Date of Patent: Jan. 8, 2019

(54) SAFETY CONTROL DEVICE AND SAFETY CONTROL SYSTEM

(71) Applicant: FUJI ELECTRIC CO., LTD., Kawasaki-shi (JP)

(72) Inventors: Hiroyuki Kokubun, Hino (JP); Yoshinobu Sato, Hachioji (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 188 days.

(21) Appl. No.: 14/668,027

(22) Filed: Mar. 25, 2015

(65) Prior Publication Data

US 2015/0287200 A1 Oct. 8, 2015

(30) Foreign Application Priority Data

Apr. 4, 2014 (JP) .................................. 2014-077932

(51) Int. Cl.
*G06T 7/00* (2017.01)
*G06T 7/20* (2017.01)
(Continued)

(52) U.S. Cl.
CPC .......... *H04N 5/23222* (2013.01); *F16P 3/142* (2013.01); *G06K 9/38* (2013.01);
(Continued)

(58) Field of Classification Search
CPC .................................................. G06T 7/0042
See application file for complete search history.

(56) References Cited

U.S. PATENT DOCUMENTS 5,272,527 A * 12/1993 Watanabe .......... G08B 13/1961
348/154
7,184,073 B2 * 2/2007 Varadarajan ........... H04N 7/183
348/148
(Continued)

FOREIGN PATENT DOCUMENTS

DE 4417128 A1 12/1995
DE 102004043514 A1 3/2006
(Continued)

OTHER PUBLICATIONS

"Lisa" Abschlusspräsentation: Assistenzroboter für Life-Science-Unternehmen; Fachtagung: Sicherheit in der Mensch-Roboter-Interaktion, Fraunhofer Institut für Fabrikbetrieb und Automatisierung IFF; 12. IFF-Wissenschaftstage Jun. 2009.
(Continued)

*Primary Examiner* — Christopher S Kelley
*Assistant Examiner* — Asmamaw G Tarko
(74) *Attorney, Agent, or Firm* — Rabin & Berdo, P.C.

(57) ABSTRACT

A safety control device causes an appropriate safety function to operate based on the positional relationship between an operator and a hazard source, the positions of which vary from moment to moment. A hazard source detection section and an operator detection section detect an image of the hazard source and an image of the operator, respectively, from an image of a monitoring area taken by an imaging instrument. A shortest distance search section searches for a shortest distance between the image of the hazard source and the image of the operator. A safety function allocation section selects a safety function based on the shortest distance found by the shortest distance search section. A safety signal generation section transmits a safety signal, which indicates the selected safety function, to an external
(Continued)

safety-related instrument using an external communication unit.

19 Claims, 15 Drawing Sheets

(51) Int. Cl.
    *H04N 5/232*     (2006.01)
    *F16P 3/14*     (2006.01)
    *G06K 9/38*     (2006.01)
    *G06T 7/60*     (2017.01)
    *G06T 7/73*     (2017.01)

(52) U.S. Cl.
    CPC ............... *G06T 7/20* (2013.01); *G06T 7/60* (2013.01); *G06T 7/73* (2017.01); *G06T 2207/10004* (2013.01); *G06T 2207/30196* (2013.01); *G06T 2207/30232* (2013.01)

(56) References Cited

U.S. PATENT DOCUMENTS

| | | | |
|---|---|---|---|
| 7,567,272 B2 * | 7/2009 | Lohmann | B25J 9/1674 |
| | | | 348/155 |
| 7,623,733 B2 | 11/2009 | Hirosawa | |
| 8,041,122 B2 | 10/2011 | Ishida et al. | |
| 8,983,204 B2 | 3/2015 | Kitajima | |
| 2001/0019357 A1 * | 9/2001 | Ito | G08B 13/19604 |
| | | | 348/152 |
| 2003/0012440 A1 * | 1/2003 | Nakanishi | G06K 9/38 |
| | | | 382/181 |
| 2003/0035051 A1 * | 2/2003 | Cho | G01S 3/7865 |
| | | | 348/169 |
| 2003/0138133 A1 * | 7/2003 | Nagaoka | G06K 9/00362 |
| | | | 382/104 |
| 2004/0227816 A1 * | 11/2004 | Sato | F16P 3/142 |
| | | | 348/152 |
| 2006/0049939 A1 * | 3/2006 | Haberer | F16P 3/144 |
| | | | 340/541 |
| 2008/0310715 A1 * | 12/2008 | Simske | G06K 9/6221 |
| | | | 382/173 |
| 2011/0050878 A1 * | 3/2011 | Wells | H04N 7/181 |
| | | | 348/86 |
| 2011/0317009 A1 * | 12/2011 | Kumaraswamy | G06K 9/00744 |
| | | | 348/143 |
| 2012/0041617 A1 * | 2/2012 | Aimura | G06K 9/00805 |
| | | | 701/1 |
| 2013/0038694 A1 * | 2/2013 | Nichani | G06T 7/20 |
| | | | 348/46 |
| 2013/0222561 A1 * | 8/2013 | Chen | A61H 3/061 |
| | | | 348/62 |
| 2014/0244303 A1 * | 8/2014 | Lynn | G06T 11/00 |
| | | | 705/3 |
| 2014/0306894 A1 * | 10/2014 | Lee | G06F 3/03543 |
| | | | 345/166 |

FOREIGN PATENT DOCUMENTS

| | | |
|---|---|---|
| JP | H04340674 A | 11/1992 |
| JP | H09330417 A | 12/1997 |
| JP | 2000-078564 A | 3/2000 |
| JP | 2004-072685 A | 3/2004 |
| JP | 2004-276154 A | 10/2004 |
| JP | 2004-282368 A | 10/2004 |
| JP | 2008-146496 A | 6/2008 |
| JP | 2012-223831 A | 11/2012 |
| JP | 2013-115751 A | 6/2013 |

OTHER PUBLICATIONS

Dominik Henrich et al, "Multi-Camera Collision Detection Between Known and Unknown Objects", 2008 IEEE.
Stefan Kuhn et al., "Velocity control for safe robot guidance based on fused vision and force/torque data", IEEE International Conference on Multisensor Fusion and Integration for Intelligent Systems, Sep. 3-6, 2006.
Paul Rybski et al: "Sensor Fusion for Human Safety in Industrial Workcells", Oct. 7, 2012, 2012 IEEE/RSJ International Conference on Intelligent Robots and Systems. 978-1-4673-1736-8/12/S31.00.
Alessandro Bevilacqua et al: "People Tracking Using a Time-of-Flight Depth Sensor", Nov. 1, 2006, Proceedings of the IEEE International Conference on Advanced Video and Signal Based Surveillance (AVSS'06).
Thrun S. et al: "Probabilistic Robotics", Jan. 1, 1999, XP055501794.

* cited by examiner

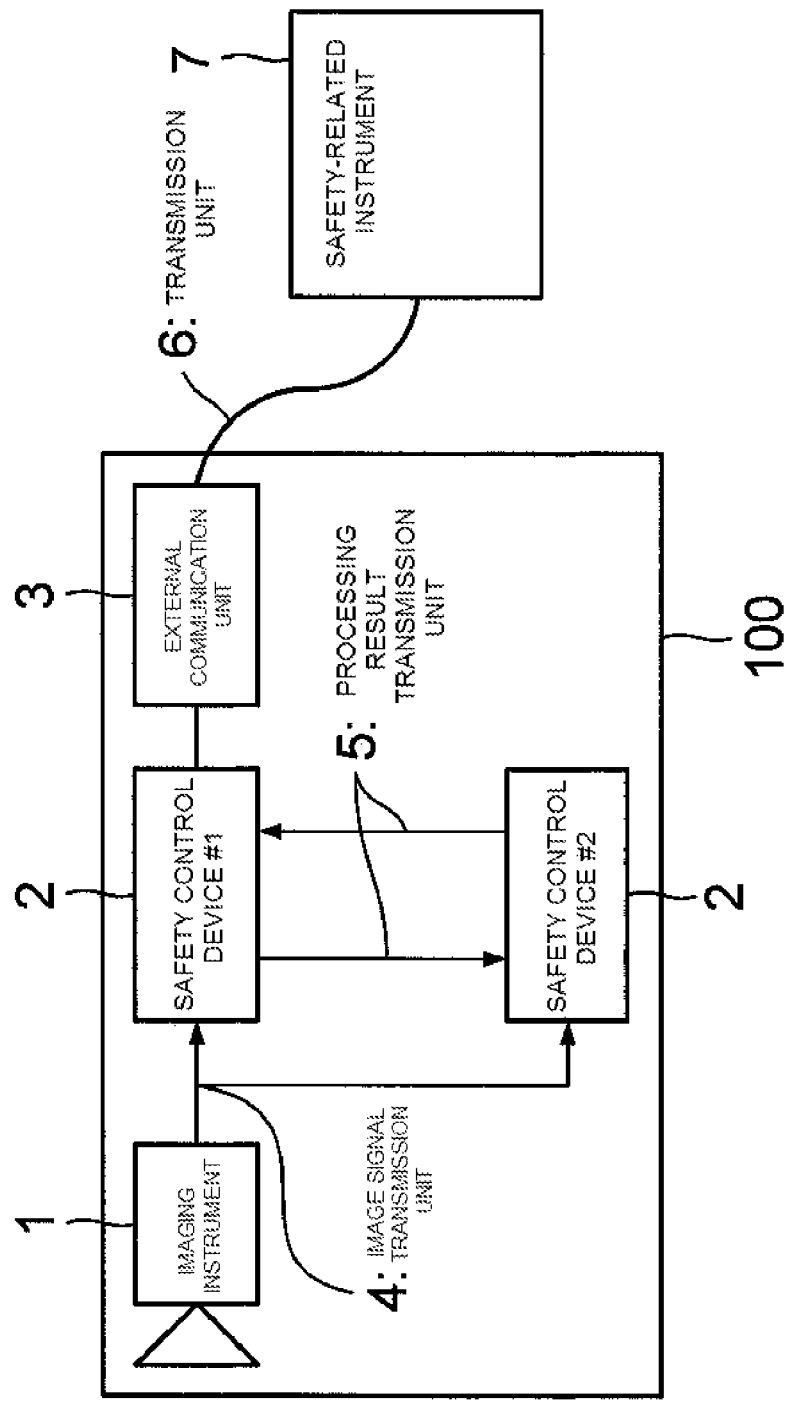

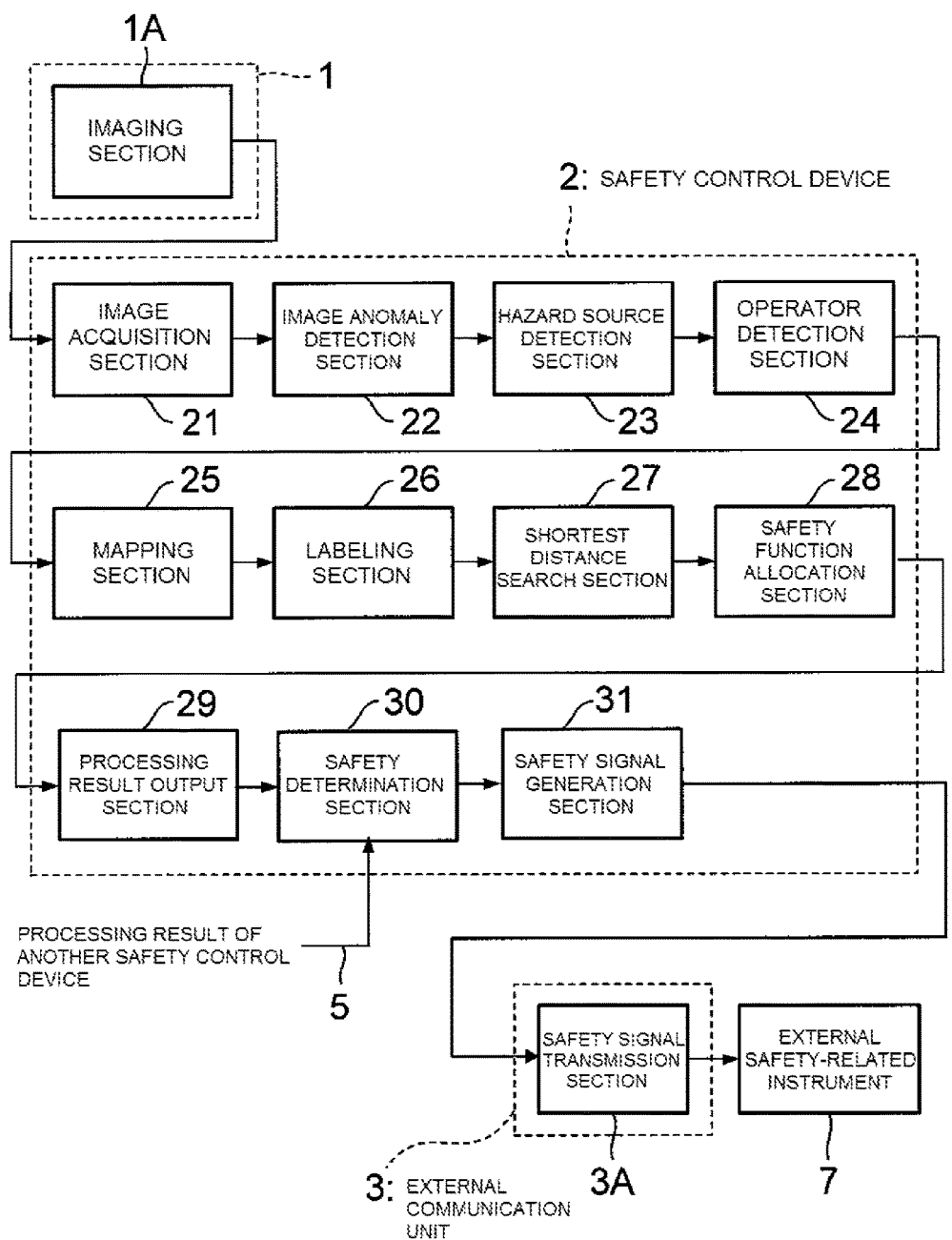

FIG. 4

| SIZE | 8bit | 1bit | 1bit | 1bit | ... |
|---|---|---|---|---|---|
| FUNCTION NAME | SAFETY COMMAND | STO | SS1 | SLS | ... |

FIG. 5

| SAFETY FUNCTION | DESIGNATION | CONTENT |
|---|---|---|
| STO | SAFETY TORQUE OFF | INTERRUPT POWER FROM DRIVE INSTRUMENT TO ELECTRIC MOTOR. STOP FREE RUNNING OF ELECTRIC MOTOR. |
| SLS | SAFETY SPEED LIMITATION | CARRY OUT OPERATION OF LIMITING ELECTRIC MOTOR TO SET SPEED. |
| SS1 | SAFETY STOP 1 | DECELERATE AND STOP ELECTRIC MOTOR IN SET DECELERATION TIME. DIFFERENT FROM FREE RUNNING STOP. |

FIG. 6

| SAFETY MEASURES | CONTENT |
|---|---|
| SEQUENCE NUMBER | NUMBER UPDATED AT EACH FRAME CHANGE |
| TIME STAMP | CONFIRM EXPIRATION OF MESSAGE |
| TIME-OUT | CONFIRM RESPONSE WITHIN SPECIFIED TIME |
| CONNECTION AUTHENTICATION | CONFIRM TRANSMISSION/RECEPTION SOURCE WITH UNIQUE NUMBER |
| FEEDBACK MESSAGE | TRANSMIT ACKNOWLEDGMENT FROM RECEPTION RESULT AND CONFIRM CONFORMITY OF MESSAGE |
| ENSURING OF DATA SAFETY | ADD REDUNDANCY CHECK OR CRC FOR PREVENTING FALSIFICATION |
| CROSS-CHECK REDUNDANCY | MUTUALLY DIAGNOSE RECEIVED MESSAGES WITH PLURALITY OF CHANNEL UNITS |
| DIFFERENT DATA COMPLETENESS ENSURING METHODS | USE DIFFERENT DATA COMPLETENESS ENSURING METHODS BETWEEN SAFETY-RELATED SYSTEM AND NON-SAFETY-RELATED SYSTEM |

| GROUP NAME | CLUSTER NUMBER | AREA | CENTROID | SIZE |
|---|---|---|---|---|
| HAZARD SOURCE M | 0xF1 | 4 | (6,2) | 3×2 |
| OPERATOR P1 | 0x01 | 6 | (2,5) | 3×2 |
| OPERATOR P2 | 0x02 | 6 | (10,6) | 3×2 |

FIG. 17

|  | HAZARD SOURCE M |
|---|---|
| OPERATOR P1 | 3 |
| OPERATOR P2 | 3 |

FIG. 18

| DISTANCE | SAFETY FUNCTION (EXAMPLE) | REMARKS |
|---|---|---|
| 0 | SBC | POWER INTERRUPTION OR BRAKE |
| 1 | STO to SBC | BRAKE STOP |
| 2 TO 3 | SLS | LOW-SPEED OPERATION |
| 4 AND MORE | NO ALLOCATION | NORMAL OPERATION |

SAFETY CONTROL DEVICE AND SAFETY CONTROL SYSTEM

CROSS-REFERENCE TO RELATED APPLICATION

This application claims the benefit of foreign priority of Japanese patent application 2014-077932, filed Apr. 4, 2014. The disclosure of this earlier application is incorporated herein by reference.

BACKGROUND OF THE INVENTION

1. Field of the Invention

The present invention relates to a safety control device and a safety control system, which maintain a drive instrument, such as a servo or an inverter, in a safe condition in a control room, a machine room, or the like.

2. Description of the Background Art

A drive instrument using power electronics, such as a servo or an inverter, is used in a fan or pump in a factory or the like, an elevator, a machine room in a building, a drive portion of a manufacturing device, or the like. In recent years, there is a growing need for the safety of this kind of drive instrument. Therefore, JP-A-2004-282368 proposes a technology wherein an image of a hazardous region is taken in a workplace in a factory, and a difference between frames of the image of the hazardous region is detected, thereby detecting an entrance of a moving object into the hazardous region. Also, in JP-A-2004-276154, an image of a monitoring object region is taken by a camera installed at a height overlooking the monitoring object region including a hazard source. Further, an entrance of an operator into the monitoring object region is detected by this imaging.

However, the heretofore known safety instruments heretofore described are such that when an operator enters an area in which a hazard source, such as a robot or a power source, exists, the hazard source is stopped in order to ensure the safety of the operator even though the operator is far enough away from the hazard source. Also, in particular, when the hazard source is a moving object such as a robot, it is necessary, in order to ensure the safety of the operator, to divide an area using a safety fence or the like between the hazard source and the operator so as to prevent the operator's entrance. Therefore, the heretofore known technology has the problem of an increase in working area or a decrease in operating rate due to stopping the robot, power source, or the like.

SUMMARY OF THE INVENTION

The invention, having been contrived bearing in mind these kinds of circumstances, has for its object to provide a safety control device which can cause an appropriate safety function to operate based on the positional relationship between an operator and a hazard source, the positions of which vary from moment to moment.

The invention provides a safety control device including an object detection unit which detects an image of a hazard source and an image of an operator from an image of a monitoring object area taken by an imaging instrument; a shortest distance search unit which searches for a shortest distance between the image of the hazard source and the image of the operator; a safety function allocation unit which selects a safety function based on the shortest distance searched for by the shortest distance search unit; and a safety signal generation unit which outputs a safety signal indicating the safety function selected by the safety function allocation unit.

According to such an aspect of the invention, a safety function is selected in accordance with the shortest distance between the image of the hazard source and the image of the operator, taken by the imaging instrument, and a safety signal indicating the safety function is output. Consequently, it is possible to cause an appropriate safety function to operate based on the positional relationship between the operator and the hazard source. In particular, in the invention, as a safety function is selected in accordance with the shortest distance between the image of the hazard source and the image of the operator, it is possible, in a kind of situation in which the distance between the hazard source and the operator is locally reduced by, for example, the operator bringing one portion of the body, such as a finger, close to the hazard source, to select an appropriate safety function in accordance with the situation.

The technologies disclosed in JP-A-2004-282368 and JP-A-2004-276154 are not such as to select a safety function based on the shortest distance between the respective taken image of the hazard source and operator, as in the invention.

BRIEF DESCRIPTION OF THE DRAWINGS

FIG. 2 is a block diagram showing a configuration of the safety control system according to the embodiment.

FIG. 3 is a block diagram showing a configuration of a safety control device in the safety control system.

FIG. 4 is a table showing a configuration example of a safety signal in the embodiment.

FIG. 5 is a table showing contents of safety functions in the embodiment.

FIG. 6 is a table showing safety measures being carried out in the communication by a black channel of the embodiment.

FIG. 15 is a table illustrating feature quantities extracted in the embodiment.

FIG. 17 is a table illustrating a result of the shortest distance search.

FIG. 18 is a table illustrating a method of allocating safety functions based on a shortest distance in the embodiment.

DETAILED DESCRIPTION OF THE INVENTION

Figure 1:
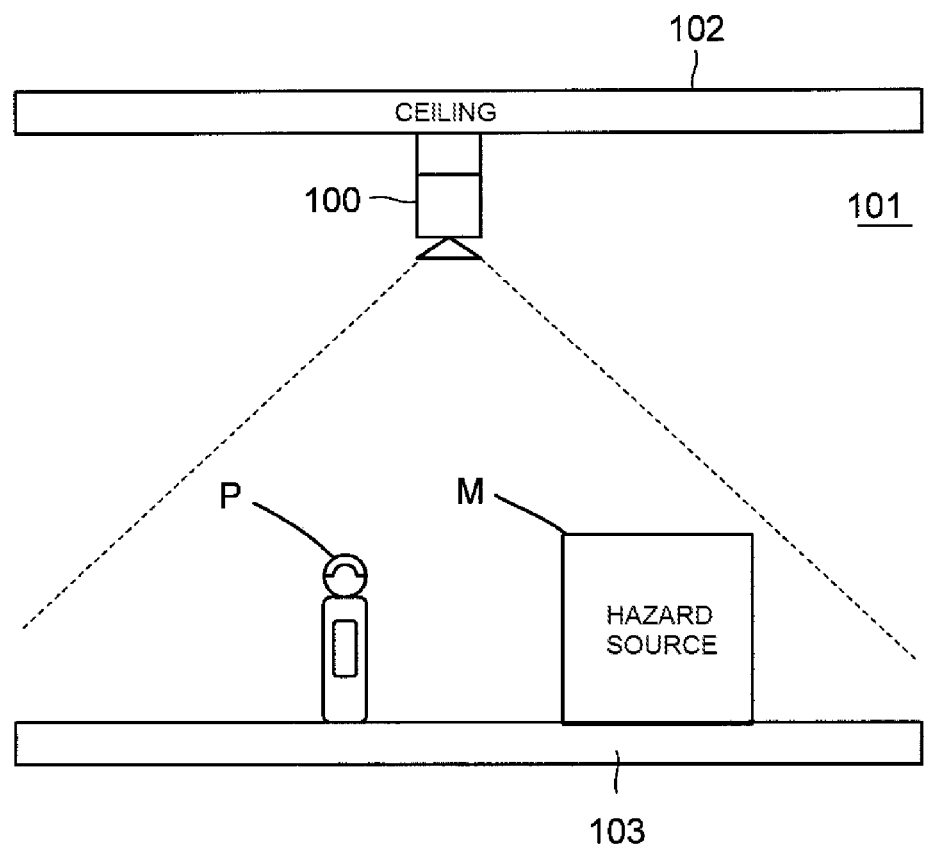
FIG. 1 is a diagram showing an example of application of a safety control system which is one embodiment of the invention.

Hereafter, a description will be given, referring to the drawings, of an embodiment of the invention.

FIG. 1 is a diagram showing an example of application of a safety control system 100 according to one example of the invention. In the illustrated example, the safety control system 100 according to the embodiment is installed on a ceiling 102 of a machine room 101. In the example shown in FIG. 1, the safety control system 100, with a space on and above a floor 103 in the machine room 101 as a monitoring object area (or simply monitoring area), takes an image of the monitoring object area. If the safety control system 100 detects that a hazard source M and an operator P have come close to each other in the monitoring object area, it generates a safety signal indicating an appropriate safety function, and supplies the safety signal to a safety-related instrument. Herein, the hazard source M is a moving object, such as a multijoint robot with a wide movable range or a conveying device, contact with which can be hazardous to the operator P. The operator P is a human being.

FIG. 2 is a block diagram showing the configuration of the safety control system 100 according to the embodiment. The safety control system 100 includes an imaging instrument 1 which takes an image of the monitoring object area, one or a plurality of safety control devices 2, each of which is configured of a microprocessor, and an external communication unit 3.

The imaging instrument 1 and the safety control devices 2 are connected via an image signal transmission unit 4 for carrying out, for example, a fast serial communication (SPI, I2C) or a parallel bus communication. Herein, in order to secure redundancy for functional safety, it is necessary, as the safety control devices 2, to use microprocessors, each of which singly meets functional safety requirements, or a plurality of common microprocessors.

As the external communication unit 3, for example, a differential communication part complying with RS485 or an Ethernet (registered trademark) communication ASIC (Application Specific Integrated Circuit) is used. The external communication unit 3 transmits safety signals, received from the safety control devices 2, to the safety-related instrument 7 using a transmission unit 6. The safety-related instrument 7, in accordance with the safety signals, carried out a control to stop or decelerate the hazard source M such as the robot.

In a safety control system 100 using a plurality of safety control devices 2, the safety control devices 2 are connected to each other via respective processing result transmission units 5. The safety control devices 2 exchange their safety function selection results with each other via the respective processing result transmission units 5 and crosscheck that there is no difference between the results. Also, each of the safety control devices 2 uses its processing result transmission unit 5 as one portion of a path through which to send a safety signal to the external communication unit 3.

FIG. 3 is a block diagram showing a functional configuration of the safety control device 2. In FIG. 3, the imaging instrument 1, the external communication unit 3, and the safety-related instrument 7 are illustrated together with the safety control device 2 for ease of comprehension of the function of the safety control device 2.

In the safety control device 2, an image acquisition section 21 is a unit which acquires an image of the monitoring object area taken by an imaging section 1A of the imaging instrument 1. An image anomaly detection section 22 carries out a process of confirming whether or not there is a problem in the image itself acquired by the image acquisition section 21. In the confirmation process, a disconnection of a cable connecting the imaging instrument 1 and the safety control device 2, a decolorization or discoloration of scanning lines due to a failure, and a whiteout or blackout due to a lighting situation are detected.

A hazard source detection section 23 and an operator detection section 24 configure an object detection unit which detects an object image, which is used to select a safety function, from the image of the monitoring object area. To give a further detailed description, the hazard source detection section 23 performs an image recognition process on the image of the monitoring object area acquired by the image acquisition section 21, and detects an image of the hazard source M, such as the robot, existing in the monitoring object area. Also, the operator detection section 24 performs an image recognition process on the image of the monitoring object area acquired by the image acquisition section 21, and detects an image of the operator P existing in the monitoring object area.

A mapping section 25 stores a monitoring table showing the monitoring object area. The monitoring table, with the monitoring object area taken to be a space, is defined as a two-dimensional or three-dimensional data table. The monitoring table can be defined as the two-dimensional or three-dimensional data table in accordance with the number of imaging instruments 1. The reason is that as a plurality of imaging instruments 1 allow the operator P and hazard source M to be detected from a plurality of directions, for example, two directions, it is possible to specify a three-dimensional position by collating positions detected from two directions. Further, the mapping section 25 maps the image of the hazard source M, detected by the hazard source detection source 23, and the image of the operator P, detected by the operator detection section 24, on the monitoring table.

A labeling section 26 is a unit which affixes labels to respective items of data of the hazard source M and operator P mapped on the monitoring table. A shortest distance search section 27 is a unit which searches for a shortest distance between the image of the hazard source M and the image of the operator P based on a processing result of the labeling section 26. A safety function allocation section 28 selects a safety function, which should be caused to operate, based on the shortest distance searched for by the shortest distance search section 27. A processing result output section 29 is a unit which supplies a safety command indicating the safety function selected by the safety function allocation section 28 to a safety determination section 30.

When the safety control system 100 has a plurality of safety control devices 2, one of the safety control devices 2 is connected to the safety-related instrument 7 via the external communication unit 3. The safety determination section 30 of the safety control device 2 connected to the safety-related instrument 7 via the external communication unit 3 carries out a process for determining a safety command to be supplied to the safety-related instrument 7. In order for the process, the safety determination section 30 receives a safety command transmitted by the processing result output section 29 of another safety control device 2.

In a preferred aspect, the safety determination section 30 generates a safety command, which is to be sent to a safety signal generation section 31, based on the safety command indicating the safety function selected by the safety function allocation section 28 of the safety control device 2 and on the safety command indicating the safety function selected by the safety function allocation section 28 of another safety control device 2. Various methods for this purpose are conceivable but, for example, a method may be such that a safety command to be sent to the safety signal generation section 31 is selected by majority from among a plurality of safety commands. Alternatively, a method may be such as to store a table wherein safety commands to be sent to the safety signal generation section 31 are defined so as to be correlated with various combinations of safety commands obtained from a plurality of safety control devices 2, and in accordance with the table, determine a safety command to be sent to the safety signal generation section 31. When the safety determination section 30 generates one safety command based on the safety commands generated by the plurality of safety control devices 2 in this way, the safety signal generation section 31 generates a safety signal indicating the one safety command and sends the safety signal to the external communication unit 3.

In another preferred aspect, the safety determination section 30 sends the safety command, indicating the safety function selected by the safety function allocation section 28 of the safety control device 2, and the safety command, indicating the safety function selected by the safety function allocation section 28 of another safety control device 2, to the safety signal generation section 31. The safety signal generation section 31 generates a safety signal into which are merged the two safety commands received from the safety determination section 30. Further, in the aspect, the safety-related instrument 7 executes the process of generating one safety command based on the safety commands generated by the plurality of safety control devices 2.

FIG. 4 is a table showing a configuration of a safety signal in this case. As shown in FIG. 4, the safety signal is a signal wherein a plurality of safety commands indicating respective safety functions selected by the safety function allocation sections 28 of the safety control devices 2 configuring the safety control system 100 are time-multiplied. In the example shown in FIG. 4, one safety command is formed of 8 bits, and each bit corresponds to a safety function. Further, in the safety command, a bit corresponding to a safety function selected by the safety function allocation section 28 is "1", and a bit corresponding to another safety function is "0". FIG. 5 is a table showing an example of safety functions corresponding to the respective bits of the safety command.

In FIG. 3, the external communication unit 3 includes a safety signal transmission section 3A. The safety signal transmission section 3A transmits a safety signal, generated by the safety signal generation section 31, to the external safety-related instrument 7. At this time, the safety signal transmission section 3A converts the form of a safety signal, received from the safety signal generation section 31, to a form, called a black channel, which follows a method set by functional safety standards or specifications. This is for preventing the safety signal from being abusive in a signal transmission path due to a disconnection, a bit garbling, a data input error, or the like. For example, a technology such as is defined in a functional safety communication field bus system defined by IEC61784-3 can be applied to the safety signal transmission section 3A.

FIG. 6 shows an example of transmission error protection measures applied to a safety signal transmission by the safety signal transmission section 3A. In the example, the safety signal transmission section 3A, when framing and transmitting a message on a safety signal or the like, transmits the message with a sequence number and time stamp added thereto. Also, when having sent a frame, the safety signal transmission section 3A, by receiving an acknowledgement therefor from a transmission destination, confirms the conformity of the message. Also, the safety signal transmission section 3A measures a specified time when having sent a frame, and when the time is up without receiving any acknowledgment from a transmission destination, carries out an appropriate process such as re-sends the frame. Also, the safety signal transmission section 3A makes a confirmation of a transmission/reception source using a unique code. Also, the safety signal transmission section 3A, when transmitting and receiving data, carries out an addition of a redundancy check or CRC for preventing a falsification. Furthermore, the safety signal transmission section 3A receives identical messages via a plurality of channels and compares one message with another. Also, the safety signal transmission section 3A, when communicating with a safety-related instrument, ensures the completeness of data using a more rigorous method, unlike when communicating with a non-safety-related instrument.

Figure 7:
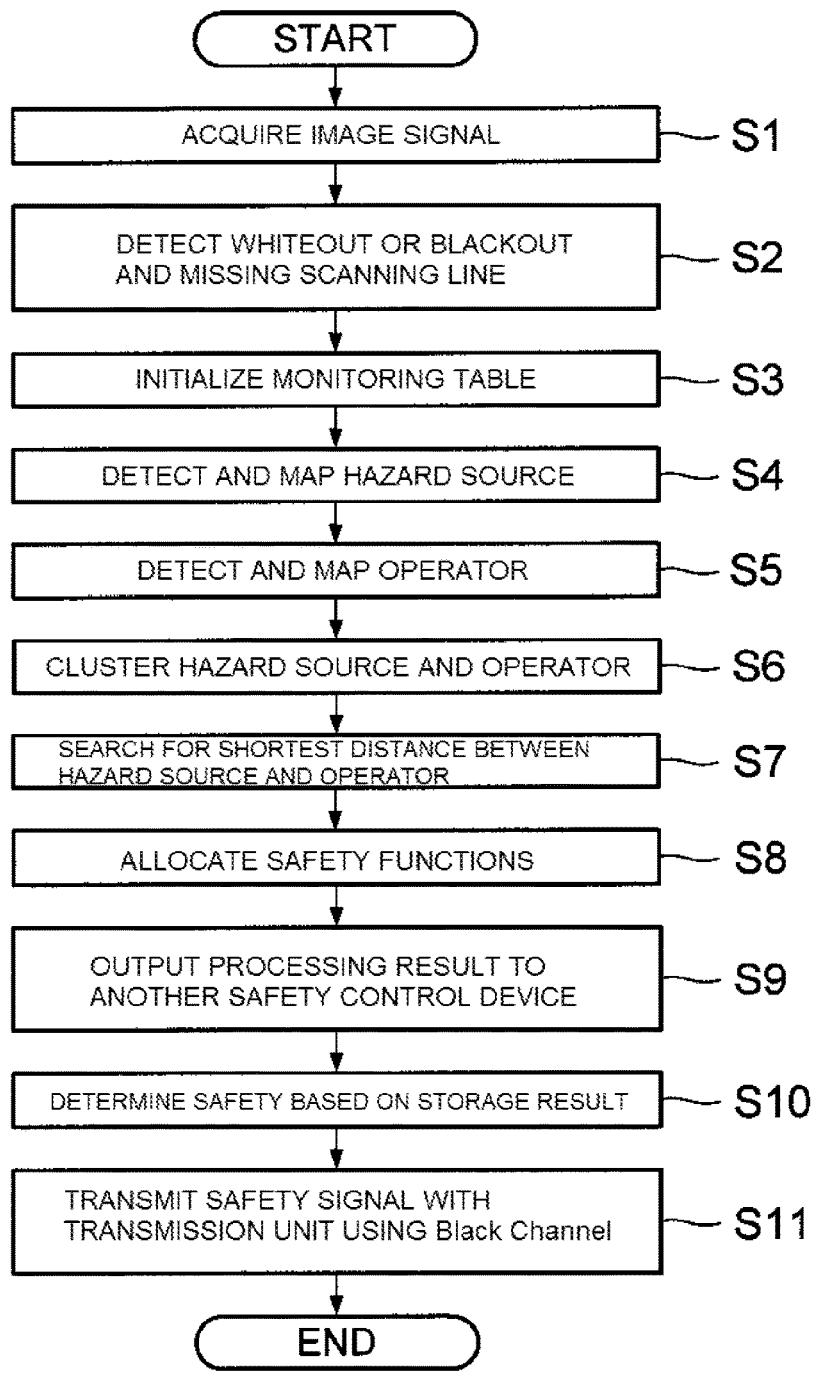
FIG. 7 is a flow chart showing an operation of the embodiment.
Figure 8:
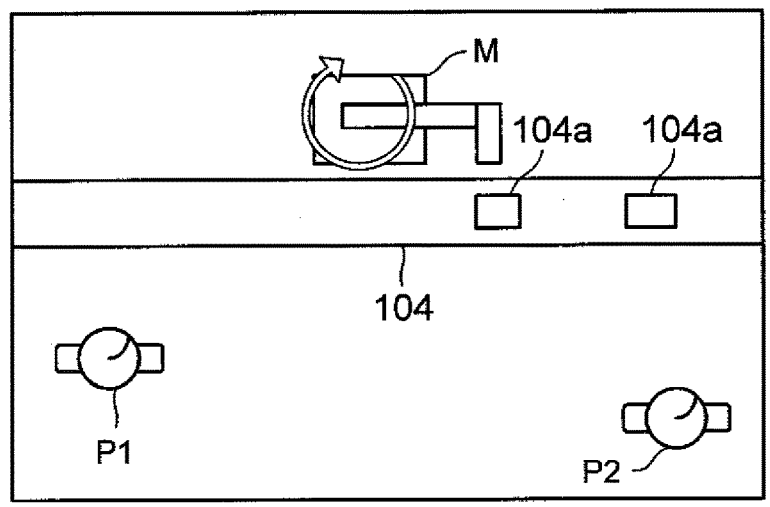
FIG. 8 is a diagram illustrating an image of a monitoring object area taken in the embodiment.
Figure 9:
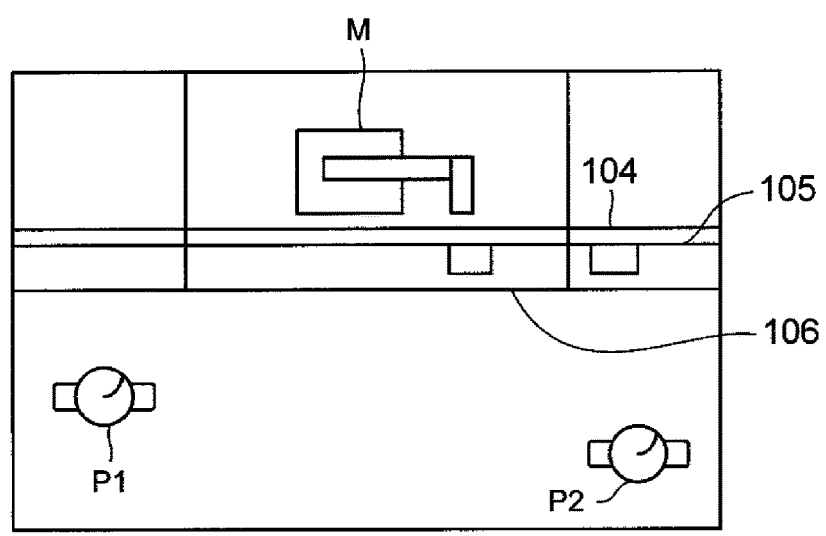
FIG. 9 is a diagram showing ranges of movements of operators and a hazard source in the image of the monitoring object area.
Figure 10A:
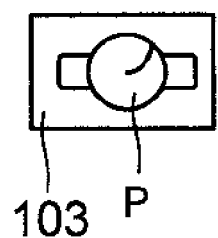
FIGS. 10A to 10D are diagrams showing a method of detecting an image of the operator in the embodiment.
Figure 10B:
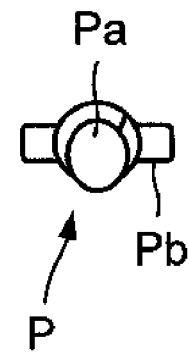
Figure 10C:
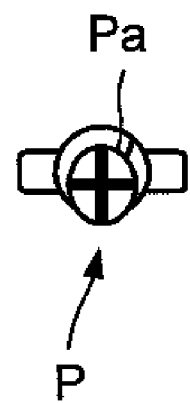
Figure 10D:

FIG. 7 is a flow chart showing an operation of the embodiment. Hereafter, a description will be given, referring to FIG. 7, of an operation of the embodiment. In the embodiment, firstly, the image acquisition section 21 acquires an image of the monitoring object area from the imaging instrument 1 (step S1). Next, the anomaly detection section 22 carries out a process of confirming whether there is a problem in the image itself acquired by the image acquisition section 21 (step S2). FIG. 8 illustrates an image of the monitoring object area which is acquired by the image acquisition section 21 and confirmed by the anomaly detection section 22 to have no anomaly. In this example, the respective images of the hazard source M, operators P1 and P2, and a conveyor belt 104 which conveys processed products 104a are included in the image of the monitoring object area. FIG. 9 illustrates a movable range 105 of the operators P1 and P2, and a movable range 106 of the hazard source M, in the monitoring object area. In the embodiment, as illustrated in FIG. 9, the hazard source M and the operators P1 and P2 are both movable, and both the movable ranges overlap each other. Consequently, it is necessary to monitor the positional relationship between the hazard source M and the operators P1 and P2 which varies from moment to moment, and when the hazard source M and the operators P1 and P2 come close to each other beyond a predetermined limit, cause an appropriate safety function to operate. The safety control device 2 according to the embodiment carries out a control for causing the appropriate safety function to operate.

When no anomaly is confirmed in the confirmation process of the anomaly detection section 22, the mapping section 25 initializes the monitoring table (step S3). Next, the hazard source detection section 23 performs an image recognition process on the image of the monitoring object area acquired by the image acquisition section 21, and detects the image of the hazard source M such as the robot, and the mapping section 25 maps data indicating the hazard source M on the monitoring table (step S4). Next, the operator detection section 24 performs an image recognition process on the image of the monitoring object area acquired by the image acquisition section 21, and detects the image of the operator P, and the mapping section 25 maps data indicating the operator P on the monitoring table (step S5).

FIGS. 10A to 10D illustrate a method of detecting an image of the operator P. The background of the operator P is the floor in the situation in which the monitoring object area is looked down at from above. In the example shown in FIG. 10A, there is a difference in color between the floor 103 and the operator P. Therefore, in the example, a region in the color of the operator P surrounded by a region in the color of the floor 103 is detected as the image of the operator P in the monitoring object area. Also, in the example shown in FIG. 10B, the image of the operator P is detected by detecting a region in the color of a hard hat Pa which the operator P wears, and a region in the color of work clothes Pb, from in the image of the monitoring object area. In the example shown in FIG. 10C, the hard hat Pa which the operator P wears is marked with a specific pattern. Therefore, in the example, the image of the operator P is detected by detecting a region with the pattern of the hard hat Pa from in the image of the monitoring object area. In the example shown in FIG. 10D, the image of the operator P is detected by detecting a region, which shows a difference from the previous image, from in the image of the monitoring object area. This method is effective in detecting a moving object. In a kind of case in which the hazard source M as well as the operator P moves, however, it is not possible, using only the method, to determine whether a detected object is the operator P or the hazard source M. Consequently, it is preferable to detect a moving object using the method, and next, using the methods shown in FIGS. 10A to 10C, determine whether the moving object is the operator P or the hazard source M.

The image of the hazard source M can also be detected by the same method as the image of the operator P. When detecting the image of the hazard source M, however, it is necessary to ignore images of the conveyor belt 104, the processed products 104a (refer to FIG. 8) moving thereon, and the like, and not to detect either of the images as the image of the hazard source M. In this case, the hazard source M only may be detected by detecting, for example, a region in a color, which the hazard source M has and which neither the conveyor belt 104 nor the processed products 104a have, from in the image of the monitoring object area. Alternatively, in the event that a region occupied by the conveyor belt 104 is known, the hazard source M may be detected from a region in the image of the monitoring object area other than the region occupied by the conveyor belt 104.

Figure 11:
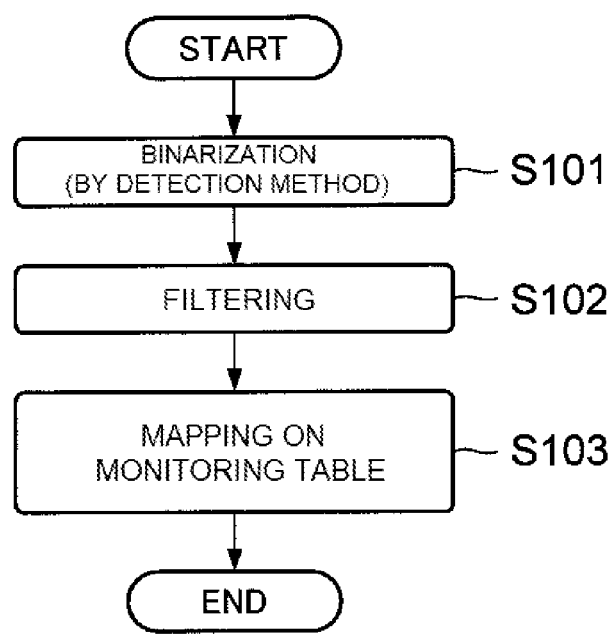
FIG. 11 is a chart showing an example of a detection and mapping of images of the operators and hazard source in the embodiment.
Figure 12:
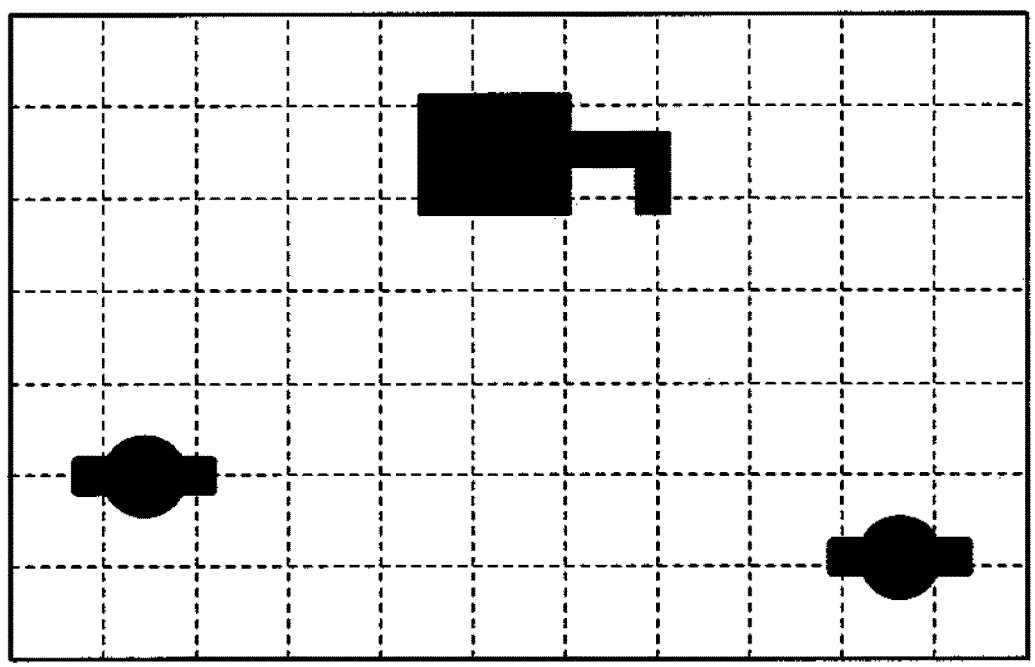
FIG. 12 is a diagram illustrating a binarized image generated in the embodiment.

FIG. 11 is a flow chart showing a detailed procedure of the detection and mapping of the hazard source (step S4) and the detection and mapping of the operator (step S5) in FIG. 7. In the embodiment, the image of the monitoring object area (refer to FIG. 8) is binarized in order to accurately obtain the regions occupied by the operator P and hazard source M (step S101). More particularly, in the embodiment, after the locations of the operator P and hazard source M are specified by the methods in FIGS. 10A to 10D, the brightness of an image in a region, of a predetermined size, centering on the positions of the locations of the operator P and hazard source M is binarized. FIG. 12 shows an example of data wherein the image is binarized. Herein, even though a common camera image is binarized, it is difficult, as noise, a boundary, or the like is included therein, to accurately detect the regions occupied by the operator P and hazard source M from the binarized image. Therefore, the noise, boundary, or the like is removed by filtering the binarized image (step S102). Further, a region occupied by the operator P and hazard source M are detected from the filtered binarized image, and mapped on the monitoring table (step S103).

Figure 13:
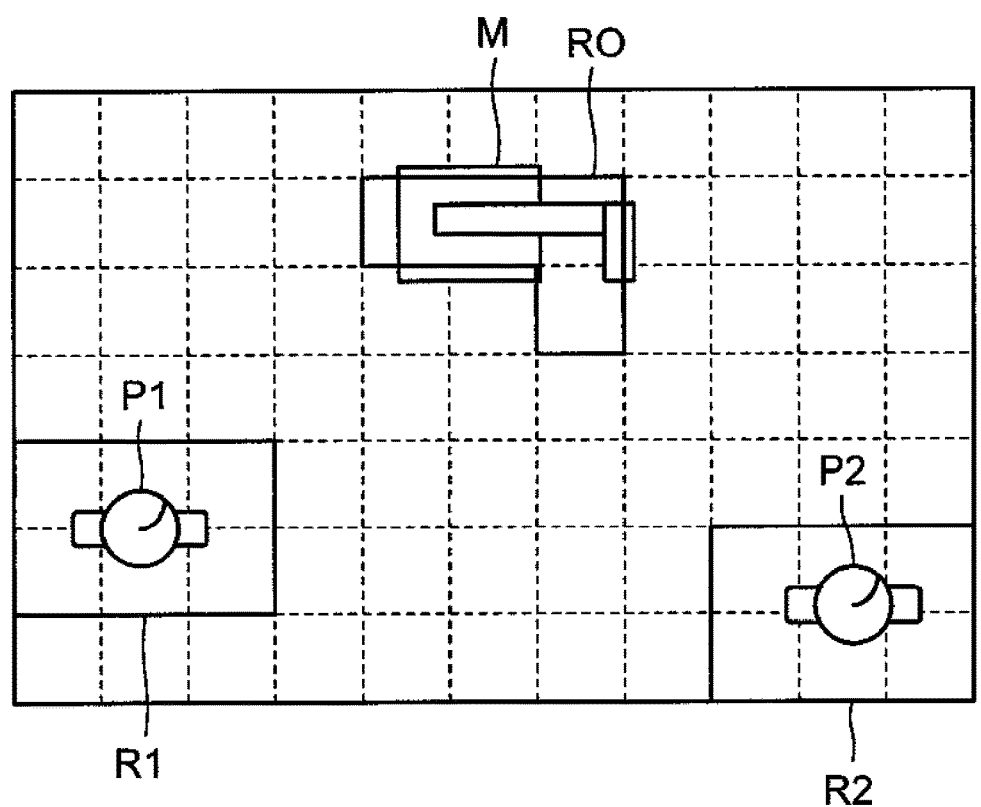
FIG. 13 is a diagram illustrating a result of the mapping in the embodiment.

FIG. 13 shows an example of a result of the mapping. In FIG. 13, R0 is a region on the monitoring table in which the image of the hazard source M is mapped, and R1 and R2 are regions in which the images of the operators P1 and P2 are mapped. In FIG. 13, for ease of comprehension, the images of the hazard source M and operators P1 and P2 shown in FIG. 8 are shown together with the mapping result. In the embodiment, the image size and monitoring table of the monitoring object area are in a correlation with each other, and when the image data of the monitoring object area are 640×480 pixels, the monitoring table is, for example, a two-dimensional data table with 64×48 units. In the embodiment, the binarized image is directly reduced in size and written on the monitoring table. At this time, the number of pixels of the operator or hazard source before being reduced in size, which is to be written in one unit of the monitoring table, is compared with a predetermined threshold value, and when the number of pixels is equal to or more than the threshold value, data indicating the existence of the operator or hazard source are written in the one unit. The threshold value can be changed by the operation of setting the safety control device 2. Also, when writing the data, indicating the existence of the operator or hazard source, in one unit of the monitoring table, data indicating the existence of the operator are set to be, for example, 0x01, and data indicating the existence of the hazard source are set to be, for example, 0xF1. By so doing, it is possible, based on data written in individual units of the monitoring table, to distinguish whether it is the operator or hazard source which occupies a region corresponding to the units.

When the above steps finish, the procedure moves to the step S6 of FIG. 7, and a clustering is carried out on the hazard source and operator. In the clustering, the labeling section 26 confirms the individual units of the monitoring table, forms a group of individual units in a continuous region formed of units in which are written the same data indicating the operator P or hazard source M, and carries out a labeling which affixes the same labels to the individual units of the group.

Specifically, when the data 0x01 indicating the operator P are written in a unit, the labeling section 26 determines whether or not there is a unit, in which the data 0x01 are written, in individual units adjacent to the unit. Further, when there is a corresponding unit, the unit is added to a group in which the data 0x01 indicating the operator P are written. By repeating this kind of step, it is possible to obtain a group of individual units in a continuous region formed of units in which the data 0x01 indicating the operator P are written. In the same way, it is also possible to obtain a group of units in which the data indicating the hazard source M are written.

Figure 14:
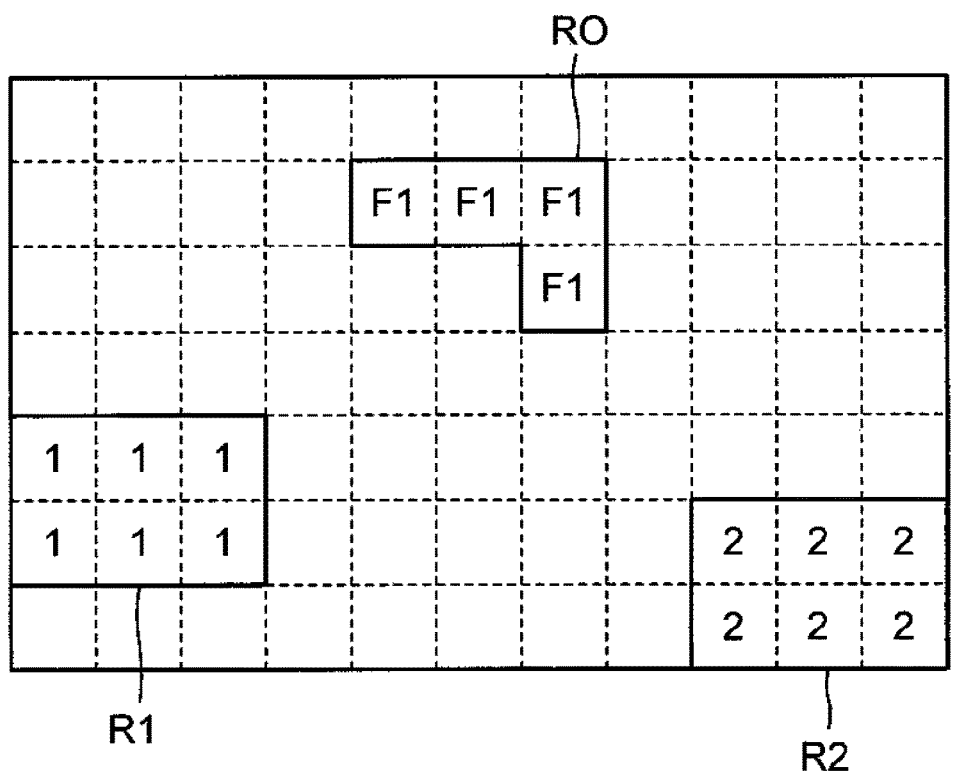
FIG. 14 is a diagram illustrating a result of labeling in the embodiment.

FIG. 14 illustrates details of a monitoring table subjected to the labeling. In this example, on the monitoring table, the label 0xF1 is affixed to each unit in the continuous region R0 occupied by the hazard source M, the label 0x01 is affixed to each unit in the continuous region R1 occupied by the operator P1, and a label 0x02 is affixed to each unit in the continuous region R2 occupied by the operator P2. The labels affixed to the continuous region R1 and the labels affixed to the continuous region R2 are different because the continuous regions R1 and R2 are not continuous with each other and are individual continuous regions separated from each other.

When the group of units indicating the hazard source M (the continuous region R0), the group of units indicating the operator P1 (the continuous region R1), and the group of units indicating the operator P2 (the continuous region R2) are obtained by the labeling, the labeling section 26 carries out a feature quantity extraction for each group, and obtains the size, centroid, and area of each group. FIG. 15 illustrates results of the feature quantity extractions.

Figure 16:
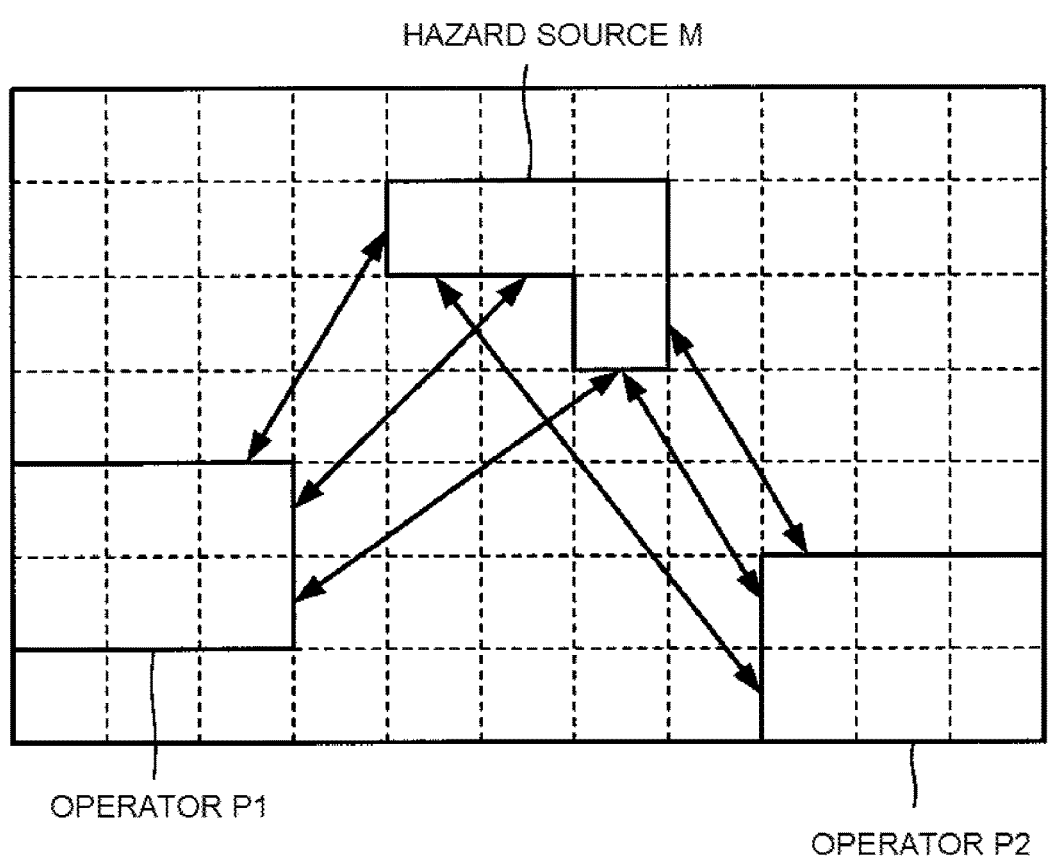
FIG. 16 is a diagram illustrating a shortest distance search carried out in the embodiment.

When the clustering by the labeling section 26 (step S6) finishes in the way heretofore described, the shortest distance search section 27 searches for the shortest distance between the respective groups of the hazard source M, operator P1, and operator P2 obtained by the clustering (step S7), as illustrated in FIG. 16. In the example shown in FIG. 16, Euclidean distances on the monitoring table between positions on the data of the operators and positions on the data of the hazard source are calculated. A plurality of definitions of the distances between the operators and the hazard source are conceivable. The shortest distance search section 27 may calculate other distances than the Euclidean distances. The calculation is carried out, on the monitoring table, between each item of data indicating the operators and each item of data indicating the hazard source. The shortest distance search section 27 sets a shortest distance, of the distances calculated in this way, to be a search object distance between the operators and the hazard source. FIG. 17 illustrates a shortest distance between each operator P1 and P2 and the hazard source M calculated by this computation of the shortest distance search section 27.

Next, the safety function allocation section 28 selects a safety function, which should be caused to operate, based on the shortest distance searched for by the shortest distance search section 27 (step S8). In order to carry out the safety function selection, the safety function allocation section 28 stores a table showing the relationship between a shortest distance between the operators and the hazard source and a safety function selected when the shortest distance is searched for, as shown in FIG. 18. When the table has therein a safety function correlated with a shortest distance searched for by the shortest distance search section 27, the safety function allocation section 28 selects the safety function.

In a preferred aspect, the safety function allocation section 28, when selecting a safety function, refers to a feature quantity obtained in the heretofore described feature quantity extraction. Specifically, the safety function allocation section 28 determines whether or not the size, centroid, and area of the operators and hazard source selected by the feature quantity extraction are each of a value in a preset range. Further, when the size, centroid, and area of the operators and hazard source are out of the respective preset ranges, the safety function allocation section 28 selects a safety function different from a standard safety function, for example, a safety function which calls a watcher.

Next, the processing result output portion 29 outputs a safety command, indicating a safety function selected by the safety function allocation section 28, to the safety determination section 30 and another safety control device 2 (step S9). Next, the safety determination section 30 receives a safety command transmitted by the processing result output section 2 of the other safety control device 2, and based on the safety command and the safety command output by the safety function allocation section 28, determines a safety command to be finally output (step S10). Next, the safety signal generation section 31 generates a safety signal indicating the safety command received from the safety determination section 30, and supplies the safety signal to the safety signal transmission section 3A (step S11). Further, the safety signal is transmitted to the safety-related instrument 7 by the safety signal transmission section 3A.

When no safety command is output by the safety function allocation section 28 or no safety command is received from the processing result output section 29 of the other safety control device 2, the safety signal generation section 31 transmits a signal, to the effect that there is no anomaly, to the safety-related instrument 7 using the safety signal transmission section 3A. This is the operation of the embodiment.

As heretofore described, according to the embodiment, a safety function is selected in accordance with the shortest distance between an image of the hazard source M and an image of the operator P which are taken by the imaging instrument 1, and a safety signal indicating the safety function is transmitted to the safety-related instrument 7 by the external communication unit 3. Consequently, it is possible to cause an appropriate safety function to operate based on the positional relationship between the operator P and the hazard source M. Also, in the embodiment, as a safety function is selected based on the shortest distance between the image of the hazard source M and the image of the operator P, it is possible, in a kind of situation in which the distance between the hazard source and the operator is locally reduced by, for example, the operator bringing one portion of the body, such as a finger, close to the hazard source, to select an appropriate safety function in accordance with the situation.

A description has heretofore been given of one embodiment of the invention, but another embodiment is conceivable for the invention. For example, in the safety control system 100 including a plurality of safety control devices 2, safety commands generated by the other respective safety control devices 2 concentrate in a safety control device 2 which carries out the transmission of a safety signal to the safety-related instrument 7. Therefore, the safety control device 2 may be configured so that the safety commands received from the respective safety control devices 2 and a log of their receipt times are stored in a memory. According to this aspect, when the plurality of safety control devices 2 include a safety control device 2 whose behavior is anomalous, such as a safety control device 2 which transmits no safety command although the other safety control devices 2 have transmitted their safety commands or a safety control device 2 which is late in transmitting a safety command, it is possible to specify the safety control device 2 from the log and fix the safety control device 2.

What is claimed is:

1. A safety control device for use with an imaging instrument, comprising:
   an object detection unit which detects an image of a hazard source and an image of an operator from an image of a monitoring area taken by the imaging instrument;
   a shortest distance search unit which searches for a shortest distance between the image of the hazard source and the image of the operator;
   a safety function allocation unit which selects a safety function based on the shortest distance found by the shortest distance search unit; and
   a safety signal generation unit which outputs a safety signal indicating the safety function selected by the safety function allocation unit; and
   a mapping unit which maps data indicating the hazard source and data indicating the operator, which are detected by the object detection unit, on a monitoring table formed of predetermined units, each unit corresponding to a plurality of pixels of the image of the monitoring area,
   wherein the mapping unit is configured to store data indicating a presence of the hazard source or operator, respectively, in one of the predetermined units when a number of pixels of the image of the monitoring area in the predetermined unit which indicate the hazard source or the operator is equal to or more than a predetermined threshold value, and wherein the image of the monitoring area is a binarized image and the mapping unit is configured to directly reduce a size of the binarized image of the monitoring area to write the data of the reduced binarized image onto the monitoring table, such that a ratio of rows to columns of the monitoring table is proportional to, and less than, a ratio of rows to columns of pixels of the image of the monitoring area.

2. The safety control device according to claim 1, wherein the shortest distance search unit searches for a shortest distance between the data of the hazard source mapped on the monitoring table and the data of the operator which are mapped on the monitoring table.

3. The safety control device according to claim 2, further comprising:

a labeling unit which affixes a single kind of label to a continuous region of units on the monitoring table in each of which an item of data indicating an identical object is mapped, and affixes different kinds of labels to a discontinuous plurality of continuous regions, thus forming each labeled continuous region into a group of the operator or hazard source, wherein the shortest distance search unit searches for the shortest distance on the monitoring table between the group of the operator and the group of the hazard source.

4. The safety control device according to claim 1, further comprising:

a feature quantity extraction unit which extracts a feature quantity of the image of the hazard source and a feature quantity of the image of the operator in the monitoring area, wherein the safety function allocation unit selects a safety function based on the feature quantity of the image of the hazard source and on the feature quantity of the image of the operator.

5. The safety control device according to claim 1, wherein the object detection unit detects the hazard source or the operator by detecting a combination of the hazard source or operator and its background color from the image of the monitoring area.

6. The safety control device according to claim 1, wherein the object detection unit detects the hazard source or the operator by detecting a combination of the colors of the individual portions of the hazard source or operator from the image of the monitoring area.

7. The safety control device according to claim 1, wherein the object detection unit detects the hazard source or the operator by detecting a pattern, included in the image of the hazard source or operator, from the image of the monitoring area.

8. The safety control device according to claim 7, wherein the object detection unit obtains a region of the image of the monitoring area in which a change has occurred, and detects the hazard source or the operator from the region.

9. The safety control device according to claim 1, wherein the object detection unit obtains a region of the image of the monitoring area in which a change has occurred, and detects the hazard source or the operator from the region.

10. The safety control device according to claim 5, wherein the object detection unit obtains a region of the image of the monitoring area in which a change has occurred, and detects the hazard source or the operator from the region.

11. The safety control device according to claim 6, wherein the object detection unit obtains a region of the image of the monitoring area in which a change has occurred, and detects the hazard source or the operator from the region.

12. The safety control device according to claim 1, wherein the object detection unit obtains a boundary of the image of the hazard source or operator by binarizing the image of the monitoring area after having specified a region of the image of the monitoring object area in which the image of the hazard source or operator resides.

13. The safety control device according to claim 12, wherein the object detection unit executes a filtering which removes noise from an image, the image of the monitoring area being binarized, and obtains the boundary of the image of the hazard source or operator.

14. The safety control device according to claim 1, further comprising:

an external communication unit which transmits the safety signal to an external instrument with a black channel which meets functional safety communication specifications.

15. A safety control system, comprising:

one or a plurality of the safety control devices according to claim 1, in combination with the imaging instrument, which takes an image of the monitoring area and supplies an image signal to the safety control device.

16. The safety control system according to claim 15, further comprising:

a disconnection detection unit which detects a disconnection between the imaging instrument and the safety control device.

17. The safety control system according to claim 16, wherein the safety control device includes a processing result output unit, which transmits a processing result of the safety function allocation unit to another safety control device, and a safety determination unit which determines a safety function, which is to be caused to operate, based on the processing result of the safety function allocation unit and on the processing result received from the processing result output unit.

18. The safety control system according to claim 15, wherein the safety control device includes a processing result output unit, which transmits a processing result of the safety function allocation unit to another safety control device, and a safety determination unit which determines a safety function, which is to be caused to operate, based on the processing result of the safety function allocation unit and on the processing result received from the processing result output unit.

19. The safety control device of claim 1, wherein the predetermined units define a grid of the monitoring area, such that each predetermined unit defines a separate area within the monitoring area.

* * * * *